R. CONRADER.
PUMP.
APPLICATION FILED JAN. 23, 1911.
1,041,596.
Patented Oct. 15, 1912.
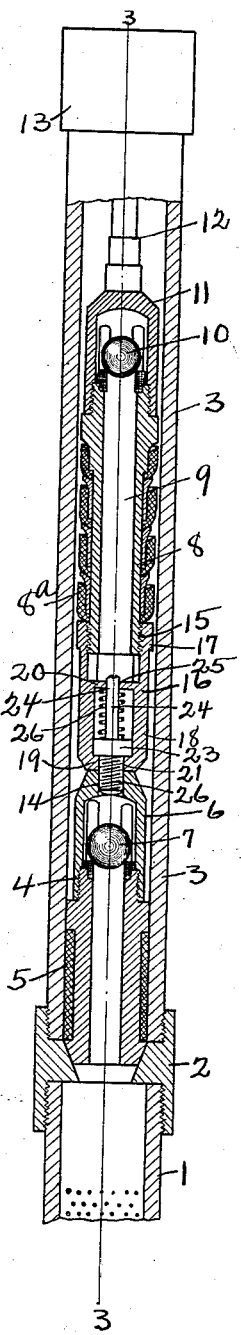
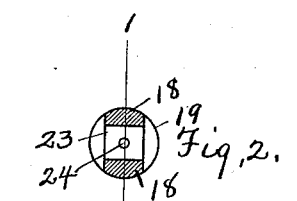
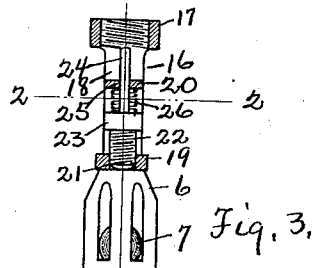
Witnesses
Blanche Hartman
Inventor
Rudolph Conrader
Attorney

UNITED STATES PATENT OFFICE.

RUDOLPH CONRADER, OF ERIE, PENNSYLVANIA.

PUMP.

1,041,596.

Specification of Letters Patent.

Patented Oct. 15, 1912.

Application filed January 23, 1911. Serial No. 604,007.

*To all whom it may concern:*

Be it known that I, RUDOLPH CONRADER, a citizen of the United States, residing at Erie, in the county of Erie and State of Pennsylvania, have invented new and useful Improvements in Pumps, of which the following is a specification.

This invention relates to pumps and consists in certain improvements in the construction thereof as will be hereinafter fully described and pointed out in the claims.

More particularly, the invention relates to pumps for Artesian wells, ordinarily oil pumps.

The object of the invention is to provide means for forming a connection between the plunger and standing valve so that the standing valve may be pulled with the plunger.

Different devices have been used as a means of connection between the plunger and the standing valve. It has been attempted to make this connection by putting a screw thread on the plunger, and forming a screw threaded opening in the crown of the standing valve. One of the objections to this construction is that as the plunger is lowered to make the connection it is very difficult to prevent the violent impact of the plunger on the crown of the standing valve, and this impact is sustained by the screw threaded projection on the plunger operating on the screw threads in the crown of the standing valve. The result is to upset or bruise these threads so that it is difficult to get the screw threaded projection to enter the opening. This is sometimes obviated by making the screw threaded projection in the form of a tap which would in itself retap the opening in the crown.

With my invention, I make one of the screw threaded members yielding so that as the plunger approaches the standing valve, the screw threaded projection yields, and is thus relieved of the pressure of the plunger and the force of the impact. At the same time, there is enough pressure on the screw threaded projection to assure its entry into the screw threaded opening of the other member, as shown the crown of the standing valve.

My invention is illustrated in the accompanying drawings as follows:

Figure 1 shows a central vertical section of a pump on the lines 1—1 in Figs. 2 and 3. Fig. 2 is a section on the line 2—2 in Fig. 3. Fig. 3 is a view, partly in section, on the line 3—3 in Fig. 1.

1 marks the strainer, 2 the fitting connecting the strainer, 3 the working barrel, 4 the standing valve, 5 the packing for the standing valve, 6 the crown of the standing valve, 7 the ball valve of the standing valve.

8 marks the plunger. The plunger has the central opening 9 which is closed by the check ball 10 arranged in the crown 11. A sucker rod 12 is connected with the crown, and the tubing 13 is connected with the working barrel.

The crown of the standing valve is provided with the screw threaded opening 14.

The plunger has the screw thread 15 at its lower end and the fitting 16 has the screw threaded socket in its upper end by means of which it may be screwed on the end of the plunger, forming a nut for the plunger cups 8ᵃ. The fitting 16 has the vertically extending sides 18 with connecting bars 19 and 20. The lower bar has the opening 21 into which is arranged the bolt 22, the head of the bolt 22 being arranged between the sides 16, and of a shape to engage the sides and prevent the turning of the bolt relatively to the fitting. A stem 24 extends upwardly from the end of the bolt through the perforation 25 in the bar 20. A spring 26 is arranged between the bar 20 and the head of the bolt.

In Fig. 1 the plunger is shown in position on the standing valve with the bolt screwed in place in the standing valve ready for lifting the standing valve.

Fig. 3 shows the bolt in engagement with the crown of the standing valve, but with the bolt pressed upwardly ready to enter the screw threaded opening 14.

In operation, the plunger is lowered so as to bring the end of the bolt against the crown of the standing valve, the bolt yielding so as to prevent the injury of the threads. The plunger is then turned through the medium of the sucker rods and the gravity of the bolt together with the spring forces the bolt forward so that it will enter the opening in the standing valve. By continued turning of the plunger, the bolt is screwed into the opening and the two members, the plunger and standing valve, locked together so that as the plunger is removed, the standing valve is removed with it.

By lowering the plunger so that it will rest on the top of the standing valve the screw joints of the sucker rod ordinarily used will, by reason of the weight of the sucker rod, tend to screw together. This is important in that it is necessary to unscrew the connection and there are, of course, the joints along the whole length of sucker rod any one of which might unscrew. By subjecting these joints to the weight of the sucker rod this tendency is largely obviated. The yielding screw permits of this method of operating the device, namely, lowering the plunger so that its entire weight is carried by the standing valve.

What I claim as new is:

1. A pump comprising as members, a plunger and standing valve; and a screw connection between said members, one part of the connection being on the standing valve and the other on the plunger, and one of said parts being yieldingly mounted on one of the members whereby the screw connection parts are yieldingly pressed together as the members approach each other.

2. A pump, comprising as members, a plunger and standing valve; and a screw connection between said members, one part of the connection being on the standing valve and the other on the plunger, and one of said parts being yieldingly mounted on one of the members whereby the screw connection parts are yieldingly pressed together as the members approach each other, said members having a limit of approach within the limits of the yielding movement of the connection.

3. A pump, comprising as members, a plunger and standing valve, one of said members having a screw threaded opening; and a yielding bolt mounted on the other of said members and adapted to enter the screw threaded opening as the members approach each other.

4. A pump, comprising as members, a plunger and standing valve, one of said members having a screw threaded opening; a yielding bolt mounted on the other of said members and adapted to enter the screw threaded opening as the members approach; and means for locking the bolt against turning relatively to the member on which it is mounted.

5. A pump, comprising as members, a plunger and standing valve, the standing valve having a screw threaded opening in the top thereof; and a screw threaded bolt yieldingly mounted on the plunger and adapted to enter with yielding pressure the opening in the standing valve as the plunger approaches the standing valve.

6. In a pump, the combination of a standing valve, having an opening in the top thereof; a plunger; a fitting secured to the bottom end of the plunger, and having openings therein leading to the plunger; a bolt slidingly mounted in the fitting and protruding through the fitting in position to enter the screw threaded opening in the standing valve; and a spring exerting a yielding pressure on the bolt.

7. In a pump, the combination of a standing valve, having an opening in the top thereof; a plunger; a fitting secured to the bottom end of the plunger, and having openings therein leading to the plunger; bars having parallel sides, the bars having perforations therein; a bolt extending through the perforation in one bar, the head of the bolt engaging the sides of the fitting and locking the bolt against turning; an extension on the bolt extending through the perforation on the other bar; and a spring between the bolt and one of the bars for exerting a yielding pressure on the bolt.

8. In a pump, the combination of a barrel; a standing valve; a screw on the standing valve; and devices for lifting the standing valve comprising a screw, one of said screws being yieldingly mounted.

9. In a pump, the combination of a barrel; a standing valve; a screw on the standing valve; and devices for lifting the standing valve comprising a screw, one of said screws being yieldingly mounted, said devices and standing valve having a limit of approach within the yielding movement of the mounting of the screw.

10. In a pump, the combination of a plunger; a yielding bolt on the plunger; and devices on the standing valve for engaging said bolt.

11. In a pump, the combination of a standing valve; a screw on the standing valve; devices for lifting the standing valve comprising a screw adapted to engage the screw on the standing valve, one of said screws being yieldingly mounted; and means for locking that screw which is yieldingly mounted against rotation.

12. In a pump, the combination of a standing valve; devices for lifting the standing valve; means forming a connection between the standing valve and said devices; and devices comprising parts yielding in an axial direction as the connection is brought into engagement to reduce the shock.

In testimony whereof I have hereunto set my hand in the presence of two subscribing witnesses.

RUDOLPH CONRADER.

Witnesses:
H. C. LORD,
BLANCHE HARTMAN.

Copies of this patent may be obtained for five cents each, by addressing the "Commissioner of Patents, Washington, D. C."